(12) United States Patent
Ralli

(10) Patent No.: US 6,357,655 B1
(45) Date of Patent: Mar. 19, 2002

(54) GOLF YARDAGE MEASURING DEVICE

(76) Inventor: John R. Ralli, 567 South St., Bridgewater, MA (US) 02324

( * ) Notice: Subject to any disclaimer, the term of this patent is extended or adjusted under 35 U.S.C. 154(b) by 0 days.

(21) Appl. No.: 09/499,656

(22) Filed: Feb. 8, 2000

(51) Int. Cl.[7] .............................................. G01C 22/00
(52) U.S. Cl. .................... 235/95 R; 377/24.2
(58) Field of Search ................. 235/95 R, 96, 235/95 B; 377/24.2, 24.1; 33/772; 434/252

(56) References Cited

U.S. PATENT DOCUMENTS

| | | | |
|---|---|---|---|
| 2,580,538 A | * | 1/1952 | Gentsch ................. 235/95 R |
| 3,202,353 A | | 8/1965 | Nowak et al. |
| 3,251,132 A | | 5/1966 | Hall |
| 3,357,636 A | | 12/1967 | Ferro, Sr. |
| D213,523 S | | 3/1969 | Shea |
| 3,458,128 A | | 7/1969 | Tillman |
| 3,543,304 A | | 11/1970 | Hed et al. |
| 3,571,933 A | | 3/1971 | Johnson |
| 3,629,557 A | * | 12/1971 | Lareau ................. 235/95 R |
| 3,643,860 A | * | 2/1972 | Murphy, Jr. et al. ...... 235/95 R |
| 4,044,471 A | | 8/1977 | Peterson |
| 4,532,710 A | | 8/1985 | Kinney et al. |
| 4,549,747 A | * | 10/1985 | Testerman ............... 280/446.1 |
| D302,616 S | | 8/1989 | Hartmann |
| D328,258 S | | 7/1992 | Millard et al. |
| 5,214,679 A | | 5/1993 | Metcalf |
| D340,787 S | | 10/1993 | Laursen |
| 5,600,113 A | | 2/1997 | Ewers |

* cited by examiner

*Primary Examiner*—Robert H. Kim
*Assistant Examiner*—Drew A. Dunn
(74) *Attorney, Agent, or Firm*—John P. McGonagle

(57) ABSTRACT

A stand-alone, mechanical, measuring wheel apparatus with a wheel and odometer. The apparatus is quickly, easily and removably attached to a golf cart by a simple attachment. The attachment, itself, is comprised of a simple clamp arrangement which is also easily attached and removed from a golf cart. The invention apparatus is stand-alone and does not require any modifications to the golf cart.

5 Claims, 4 Drawing Sheets

GOLF YARDAGE MEASURING DEVICE

BACKGROUND OF THE INVENTION

This invention relates to measuring devices and, in particular, to a device for measuring the distance traveled on a golf course especially between a green and a hole of the golf course.

Golf courses are divided into eighteen holes of varying yardage lengths and difficulty. Prior to striking his or her first shot from a "Tee" at the beginning of a particular hole, the golfer must know the length and difficulty of the hole. This information is usually available at the Tee or on the golfer's scorecard. After a golfer has teed off, he or she will want to know the length of his or her most recent drive or shot, and will need to estimate the remaining distance to the green which contains the hole and pin. The remaining distance is an important factor in club selection. Improper club selection for a particular distance may cause a golfer to overshoot or undershoot the green.

It would thus be useful for a golfer to have a way of determining the distance of a drive or shot to a present lie and the distance from the present lie to the pin. However, after teeing off, a golfer can usually only make a visual estimate of that distance, sometimes assisted by fixed distance markers. For example, it is common to have some type of marker on or adjacent a fairway 150 yards from the center of the green.

The prior art has many examples of distance measuring instruments of the odometer type including those used with golfing equipment. The use of odometer devices is known in the prior art. Odometers used with golf carts are generally comprised of a counting device driven by reduction gearing extending to a friction roller or pulley which is maintained in contact with the periphery of the tire of a selected one of the golf cart wheels. Most of these instruments are sophisticated, complex and require substantial modifications. Such devices are usually factory installed due to the fact that certain dismantling has to be undertaken. Alternatively, attachments are provided which operate by a small wheel frictionally engaging the tire of one of the golf cart wheels and this wheel comes in contact through a flexible cable to a counter. However, such devices slip badly particularly when used on wet ground and, therefore, are not entirely satisfactory. Furthermore, the wheel of a golf cart undergoes relatively high shock loads when driven or pulled around the average golf course. Complex mechanisms will not operate reliably under these conditions.

Notwithstanding the known prior art, there remains a need for a device adapted for use with a golf cart that is small, inexpensive, easily moved from one golf cart to another, and yet effective for measuring distance. The present invention is directed to such a device.

SUMMARY OF THE INVENTION

The present invention is comprised of a stand-alone, measuring wheel apparatus with a wheel and odometer. The apparatus is quickly, easily and removably attached to a golf cart by a simple attachment means. The attachment means, itself, is comprised of a simple clamp arrangement which is also easily attached and removed from a golf cart. The measuring wheel apparatus and odometer are mechanical not requiring any electrical power sources. The invention apparatus is stand-alone and does not require any modifications to the golf cart.

Therefore, a primary object of the present invention is to provide a portable distance measuring device for golfers.

It is another object of the present invention to provide a device for determining and displaying distance to and from a present lie either from a tee or to the green for a golfer playing a particular hole on a golf course.

It is yet another object of the present invention to provide a distance measuring device that can be used on a hand pulled cart, or on an electric or other motorized golf cart.

These, together with other objects of the invention, along with various features of novelty which characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

DETAILED DESCRIPTION OF THE INVENTION

Figure 1:
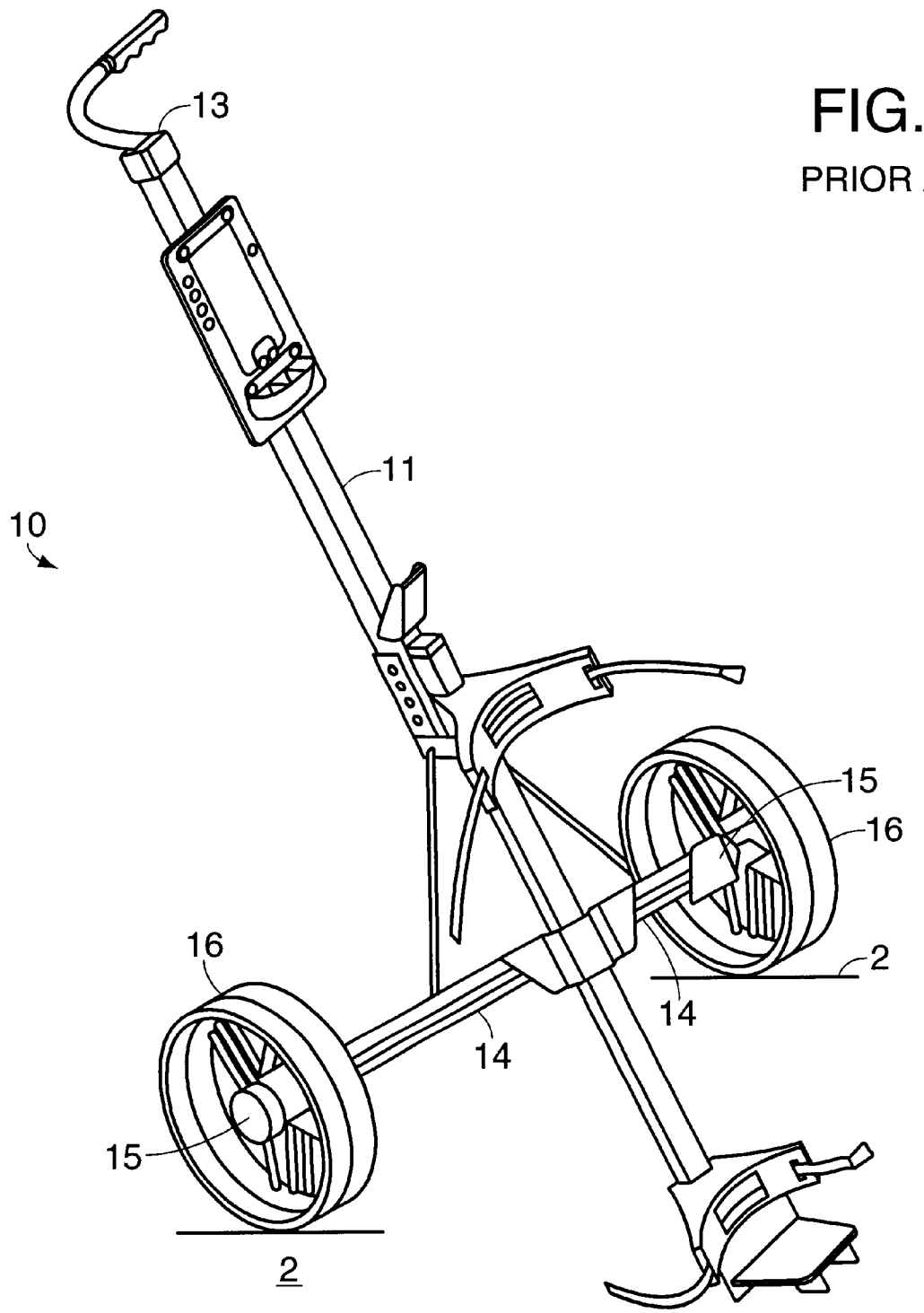
FIG. 1 is a perspective view of a typical golf cart.
Figure 2:
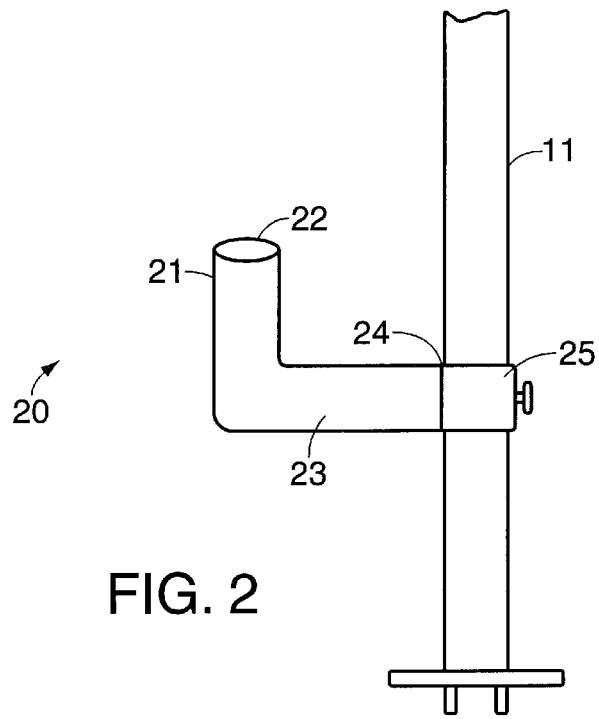
FIG. 2 is a schematic, rear view of a golf cart, partly in section, with an attachment bracket.
Figure 3:
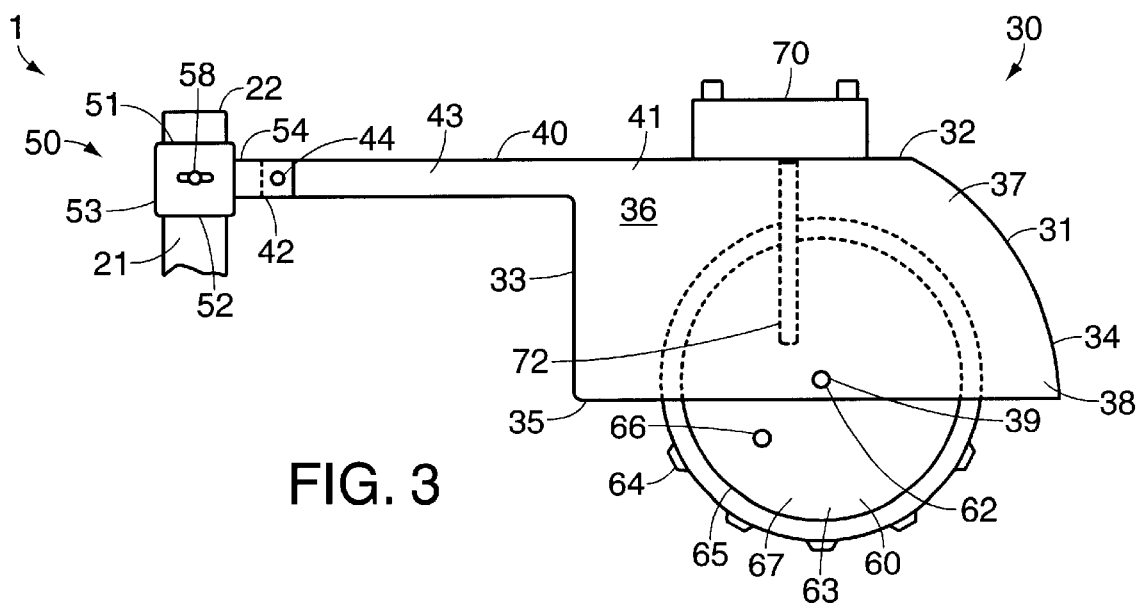
FIG. 3 is a side plan view of the measuring wheel apparatus.
Figure 4:
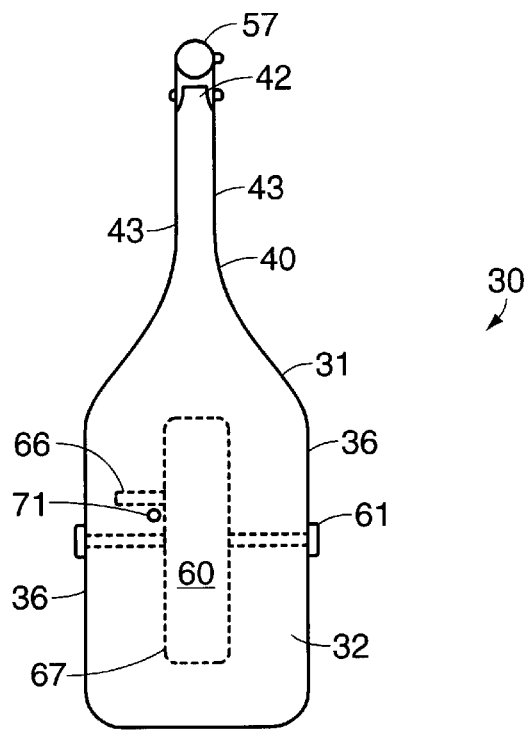
FIG. 4 is a top plan view of the measuring wheel apparatus.
Figure 5:
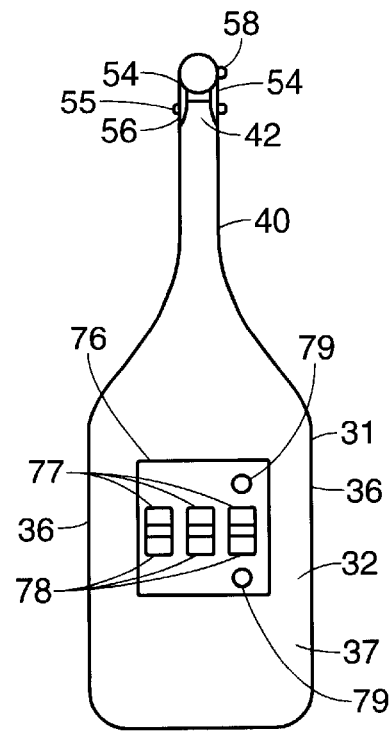
FIG. 5 is a top view of the measuring wheel apparatus.
Figure 6:
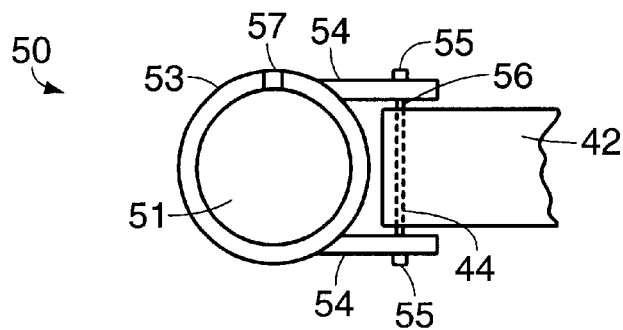
FIG. 6 is a top view of the cylindrical clamping element.
Figure 7:
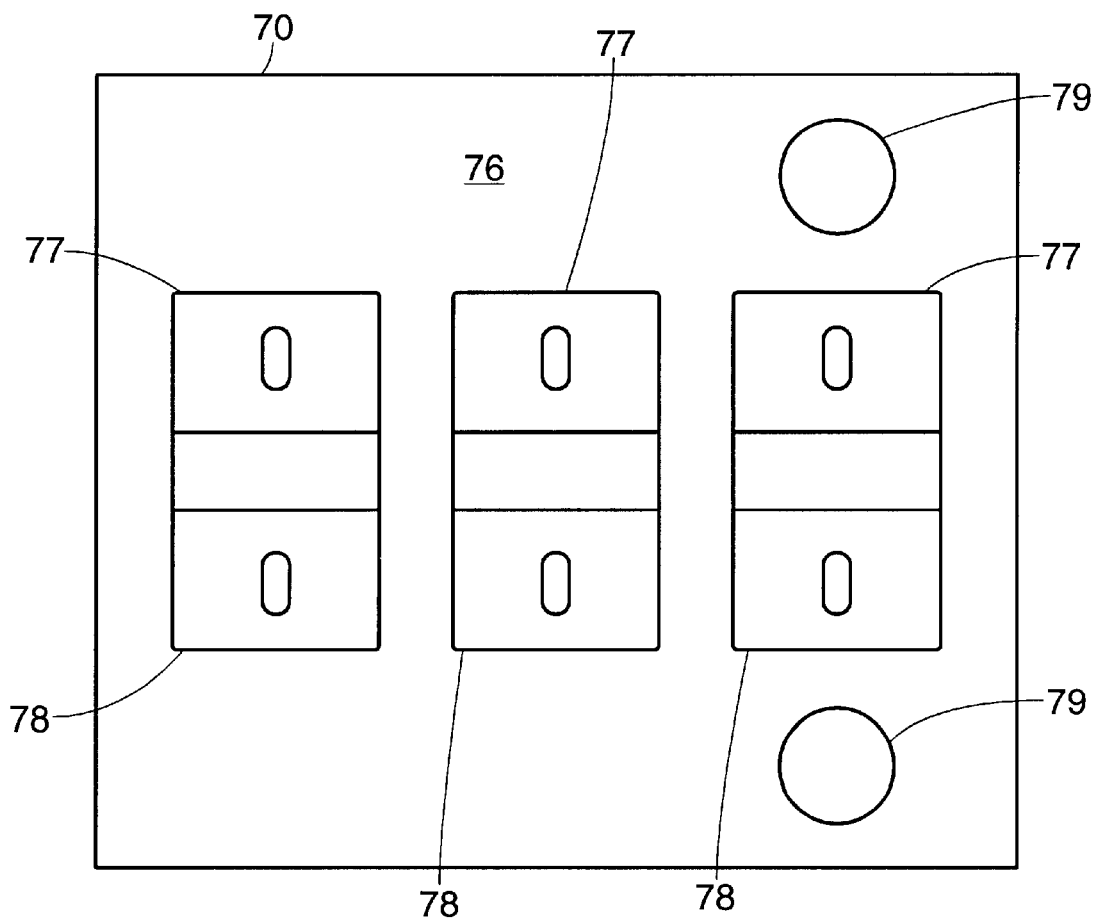
FIG. 7 is a top view of the odometer display.

Referring to the drawings in detail wherein like elements are indicated by like numerals, there is shown a common form of "pull" cart 10 comprising an elongated main frame member 11 with means for securing a golf bag (not shown) thereto. Said main frame member 11 supports a handle 13 on one end and on the other end a pair of tubular struts 14, each strut supporting an axle member 15 on which a wheel 16 is mounted. Although there are many variations of golf pull carts, all will have the same basic elements in one form or another.

The invention 1 is comprised of a tubular attachment bracket 20 and a measuring wheel apparatus 30 with an odometer 70 attached. The attachment bracket 20 is clamped to one of the cart struts 14 or to the main frame member 11. The attachment bracket 20 has two portions, an engagement portion 21 the end 22 of which is positioned generally vertically with respect to the ground 2 engaging the cart wheels 16, and an attachment portion 23 the end 24 of which is formed into a clamp 25 which is removably attached to either a cart strut 14 or the main frame member 11.

The measuring wheel apparatus 30 is comprised of a housing 31 with a wheel 60, and an elongated attachment element 40. The housing 31 has a top 32, front 33, rear 34, open bottom 35, two parallel sides 36 and an exterior surface 37, said front 33 and rear 34 defining a housing longitudinal axis. The housing top 32, front 33, rear 34 and sides 36 define a hollow housing interior 38. Each side 36 has a hole 39 formed therein near to the bottom 35 at an approximate midpoint between the front 33 and rear 34, the hole 39 in each side 36 being parallel with the hole 39 in the other side 36, said holes 39 defining an axis transverse to the housing longitudinal axis.

A wheel 60 is rotatably joined to the housing 31 by means of an axle 61 joined to the housing side holes 39, said axle 61 engaging a central hole 62 in the wheel, said hole 62 being transverse to a radial plane of the wheel 60. In this embodiment of the invention, the wheel 60 has a solid hub 63 and a tire 64 fixed to the wheel perimeter 65. One side 67 of the hub 63 has an elongated pin 66 protruding therefrom, said pin 66 having a longitudinal axis parallel to the longitudinal axis of the axle 61. The width in the housing interior 38 between the housing sides 36 exceeds the combined width of the wheel 60 and length of the pin 66.

An elongated attachment element 40 extends forward from a junction 41 of the housing front 33 and top 32. The attachment element 40 has two parallel sides 43 and a forward end 42. The elongated attachment element 40 has a longitudinal axis defined by its forward end 42 and the junction 41, said longitudinal axis being parallel to the longitudinal axis of the housing 31. Each attachment element side 43 has a hole 44 formed therein near to the forward end 42, the hole 44 in each side 43 being parallel with the hole 44 in the other side 43, said holes 44 defining an axis transverse to the attachment element longitudinal axis.

A cylindrical clamping element 50 adapted to joining the attachment element forward end 42 is provided. The cylindrical clamping element 50 has an open top 51 and a parallel, open bottom 52, said top 51 and bottom 52 being interconnected by a rounded side wall 53. Two generally tangential and parallel rectangular elements 54 protrude from the side wall 53, said elements 54 lying in planes transverse to a radial plane of the cylindrical clamping element 50. Each rectangular element has a hole 55 formed therein at an approximate central point, the hole 55 in each element 54 being parallel with the hole 55 in the other element 54, said holes 55 defining an axis transverse to a cylindrical clamping element central axis. The cylindrical clamping element parallel rectangular elements 54 are positioned about each attachment element side 43 so that the rectangular element holes 55 are aligned with the attachment element side holes 44. A pin 56 is inserted through the holes 44, 55 thereby joining the cylindrical clamping element 50 to the attachment element 40 in a vertical and pivotal relationship. In one embodiment of the invention a threaded hole 57 is formed in the clamping element side wall 53. A threaded locking screw 58 threadingly engages the hole 57.

A mechanical odometer 70 of conventional construction is attached to the measuring wheel apparatus housing top 32. A hole 71 is formed in the housing top 32. The odometer 70 has a protruding member 72 extending downwardly alongside the wheel hub side 67 with the protruding pin 66. The protruding member 72 is adapted to engage the wheel protruding pin 66 once during one 360° revolution of the wheel 60. The protruding member 72 increments a mechanical counter within the odometer upon each engagement with the wheel's protruding pin 66. The wheel 60 and tire 64 diameters are pre-measured and the odometer mechanical counter calibrated to reflect the linear distance of one full wheel revolution. The odometer 70 also has a dual display 76 for permitting a user to not only measure the distance traveled but also to input a distance to the hole on a golf course into the odometer such that as the golf cart is moved towards the hole the distance traveled by the invention is also subtracted from the distance to the hole to inform the user of the distance left to the hole. The display 76 has a subdisplay 77 presenting each increasing odometer count, preferably in yards or increments of yards. The display 76 also has a subdisplay 78 presenting a count subtraction from a user-selected number, preferably in yards or increments of yards. The display 76 also has the means, actuated by a button 79 or lever of resetting either or both subdisplays, or of temporarily disabling the counter for unmeasured traveling when looking for a ball.

In operation, the attachment bracket 20 is clamped to one of the cart struts 14 or to the main frame member 11. The measuring wheel apparatus 30 is attached to the attachment bracket 20 by sliding engaging of the measuring wheel apparatus attachment element cylindrical clamping element 50 over the attachment bracket engagement portion end 22. The locking screw 58 is screwed through the threaded hole 57 thereby engaging the attachment bracket engagement portion 21 and thereby holding the clamping element 50 firmly over the engagement portion end 22. By joining the cylindrical clamping element 50 to the attachment element 40 in a vertical and pivotal relationship, the housing 31 and thereby the wheel 60 can smoothly accommodate variations in terrain, continuously engage the ground without being dislodged from the golf cart 10, and truly reflect the distance being covered by the golf cart 10.

It is understood that the above-described embodiments are merely illustrative of the application. Other embodiments may be readily devised by those skilled in the art which will embody the principles of the invention and fall within the spirit and scope thereof.

I claim:

1. A golf yardage measuring apparatus, attachable to a pull-type golf cart having an elongated main frame member with two ends, one end supporting a handle and the other end having a pair of tubular struts, each strut supporting an axle member on which a ground-engaging wheel is mounted, comprising:

a tubular attachment bracket clamped to said golf cart, said attachment bracket having two portions, an engagement portion having an end positioned generally vertically with respect to the ground engaging the cart wheels, and an attachment portion having an end formed into a clamp which is removably attached to the cart;

a measuring wheel apparatus removably attached to said attachment bracket, said measuring wheel apparatus being comprised of:

a housing with a wheel having a hub and outer perimeter, said housing having a top with a hole formed therein, a front, a rear, an open bottom, two parallel sides and an exterior surface, said front and rear defining a housing longitudinal axis, said housing top, front, rear and sides defining a hollow housing interior, each side having a hole formed therein near to the bottom at an approximate midpoint between the front and rear, the hole in each side being parallel with the hole in the other side, said holes defining an axis transverse to the housing longitudinal axis, said wheel being rotatably joined to the housing by means of an axle joined to the housing side holes, said axle engaging a central hole through the hub in the wheel, said wheel hole being transverse to a radial plane of the wheel, one said side of said wheel hub having an elongated pin protruding therefrom, said pin having a longitudinal axis parallel to the longitudinal axis of the axle, said housing interior has a width between the housing sides exceeding the combined width of the wheel and length of the pin;

an elongated attachment element extending forward from a junction of the housing front and top, said attachment element having two parallel sides and a forward end and a longitudinal axis defined by said forward end and said junction, said longitudinal axis being parallel to the longitudinal axis of the housing, each said attachment element side having a hole formed therein near to the forward end, the hole in each side being parallel with the hole in the other side, said holes defining an axis transverse to the attachment element longitudinal axis; and a cylindrical clamping element adapted to joining the attachment element forward end, said cylindrical clamping element having an open top and a parallel, open bottom, said top and bottom being interconnected by a rounded side wall, said side wall having two generally tangential and parallel rectangular elements protrude therefrom, said rectangular elements lying in planes transverse to a radial plane of the cylindrical clamping element, each rectangular element having a hole formed therein at an approximate central point, the hole in each rectangular element being parallel with the hole in the other rectangular element, said holes defining an axis transverse to a cylindrical clamping element central axis, the cylindrical clamping element parallel rectangular elements being positioned about each attachment element side so that the rectangular element holes are aligned with the attachment element side holes;

a mechanical odometer attached to said measuring wheel apparatus, said odometer beings attached to the measuring wheel apparatus housing top, said odometer having a protruding member extending downwardly through said housing top hole alongside the wheel hub side with the protruding pin, said protruding member adapted to engage the wheel protruding pin once during each 360° revolution of the wheel, wherein said protruding member increments a mechanical counter within the odometer upon each engagement with the wheel's protruding pin, said odometer having a dual display adapted to show distance traveled and a distance to go; and a pin adapted to being inserted through the attachment element holes and cylindrical clamping element holes thereby joining the cylindrical clamping element to the attachment element in a vertical and pivotal relationship.

2. A golf yardage measuring apparatus as recited in claim 1, wherein said measuring wheel apparatus is further comprised of:

a threaded hole formed in the clamping element side wall; and a threaded locking screw adapted to threadingly engage said threaded hole.

3. A golf yardage measuring apparatus as recited in claim 2, wherein:

said dual display has a subdisplay presenting an increasing odometer count and a subdisplay presenting a count subtraction from a user-selected number.

4. A golf yardage measuring apparatus as recited in claim 3, wherein:

said dual display has a means for resetting each subdisplay and for temporarily disabling a subdisplay count.

5. A golf yardage measuring apparatus as recited in claim 4, wherein:

the wheel has a pre-measured diameter for calibrating the odometer mechanical counter to reflect the linear distance of one full wheel revolution.

* * * * *